United States Patent [19]

Willingham

[11] 4,436,457
[45] Mar. 13, 1984

[54] SUCTION PIPE

[75] Inventor: James T. Willingham, Lubbock, Tex.

[73] Assignee: South Plains Sheet Metal, Inc., Lubbock, Tex.

[21] Appl. No.: 322,391

[22] Filed: Nov. 17, 1981

[51] Int. Cl.³ .............................................. B65G 53/52
[52] U.S. Cl. ................................................... 406/116
[58] Field of Search ................... 406/29, 32, 113–116, 406/164–167; 105/153; 104/295

[56] References Cited

U.S. PATENT DOCUMENTS

| | | | |
|---|---|---|---|
| 2,608,163 | 8/1952 | Martin | 105/153 |
| 3,260,550 | 7/1966 | Miller | 406/115 |
| 3,262,742 | 7/1966 | Sipe et al. | 406/116 |
| 4,143,921 | 3/1979 | Sweeney et al. | 406/115 |

FOREIGN PATENT DOCUMENTS 2102898  2/1972  Fed. Rep. of Germany ...... 406/167

Primary Examiner—John J. Love
Assistant Examiner—Paul A. Sobel
Attorney, Agent, or Firm—Wendell Coffee

[57] ABSTRACT

Each section of telescoping pipe is supported by a hanger depending from a straight, horizontal, elevated, transverse beam. The beam is mounted for traverse travel on overhead structures. A special suction head is carried by a carriage and connected to the last of the telescoping sections. A pick-up pipe depends from the special suction head. The structural support of the suction pipe is separated from the air seals therein. When the pipe is angled forward, an electric motor upon the carriage drives a pneumatic tire pushing against the beam to extend the telescoping sections. When the pickup pipe angles back, the electric motor is driven in the opposite or reverse direction to retract the sections of pipe.

2 Claims, 12 Drawing Figures

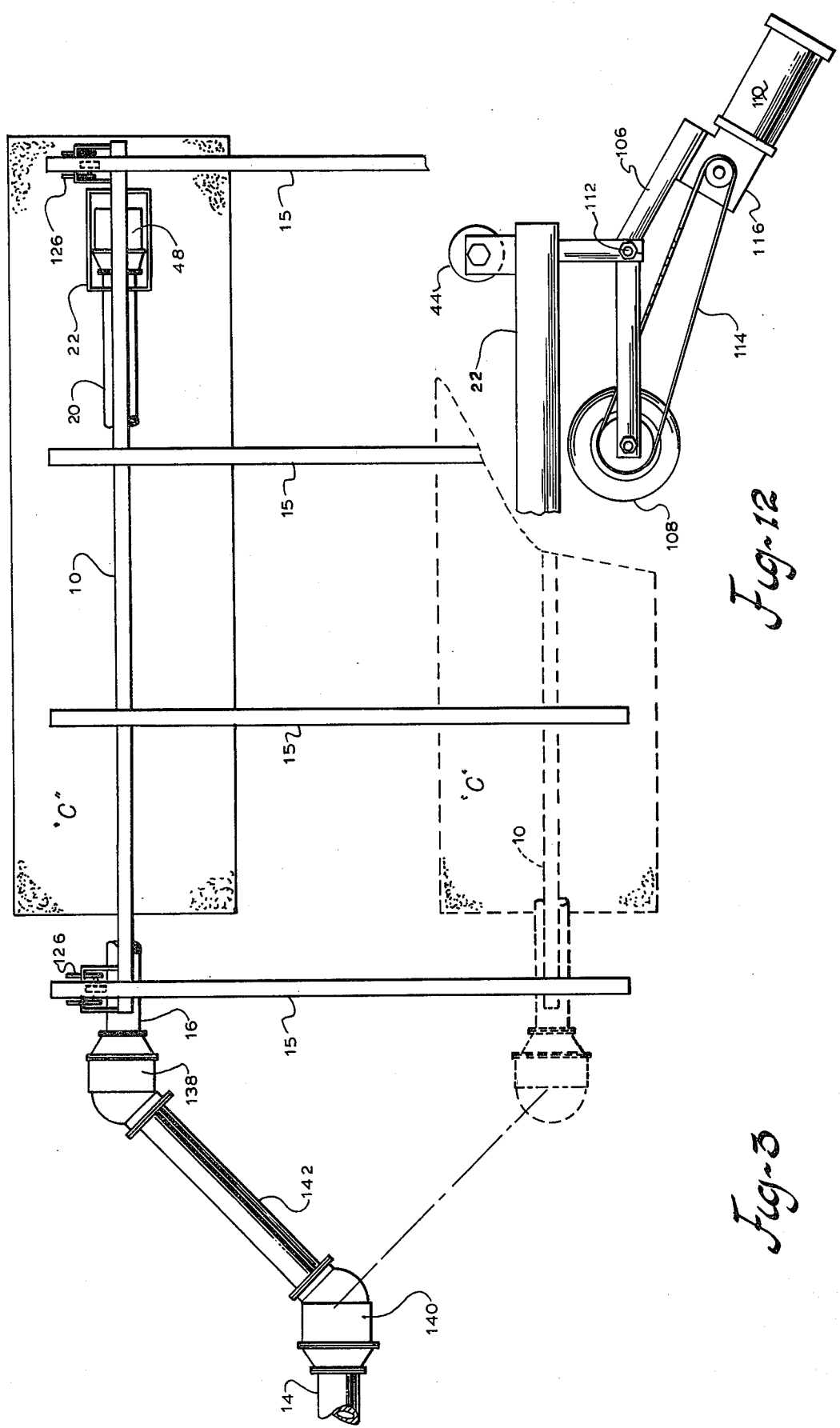

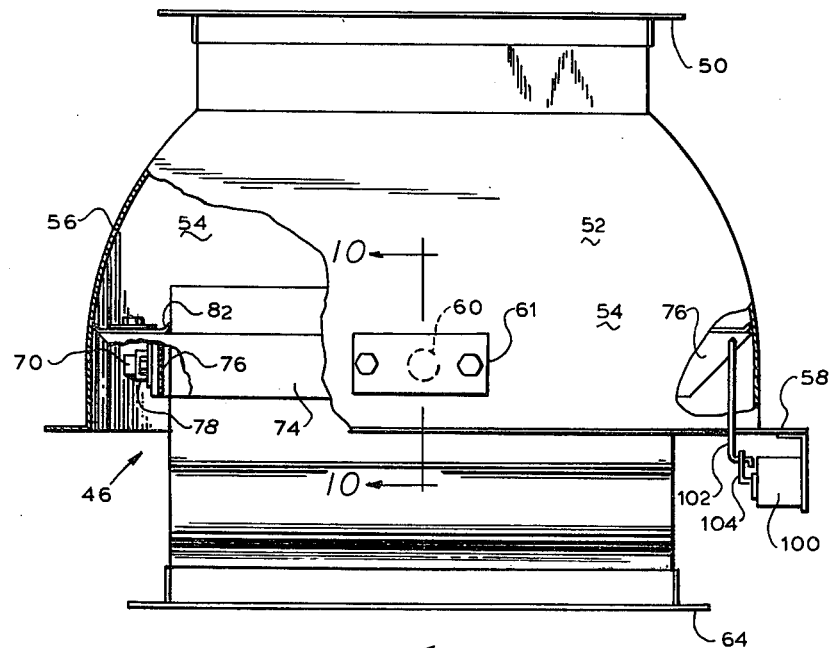
Fig-9
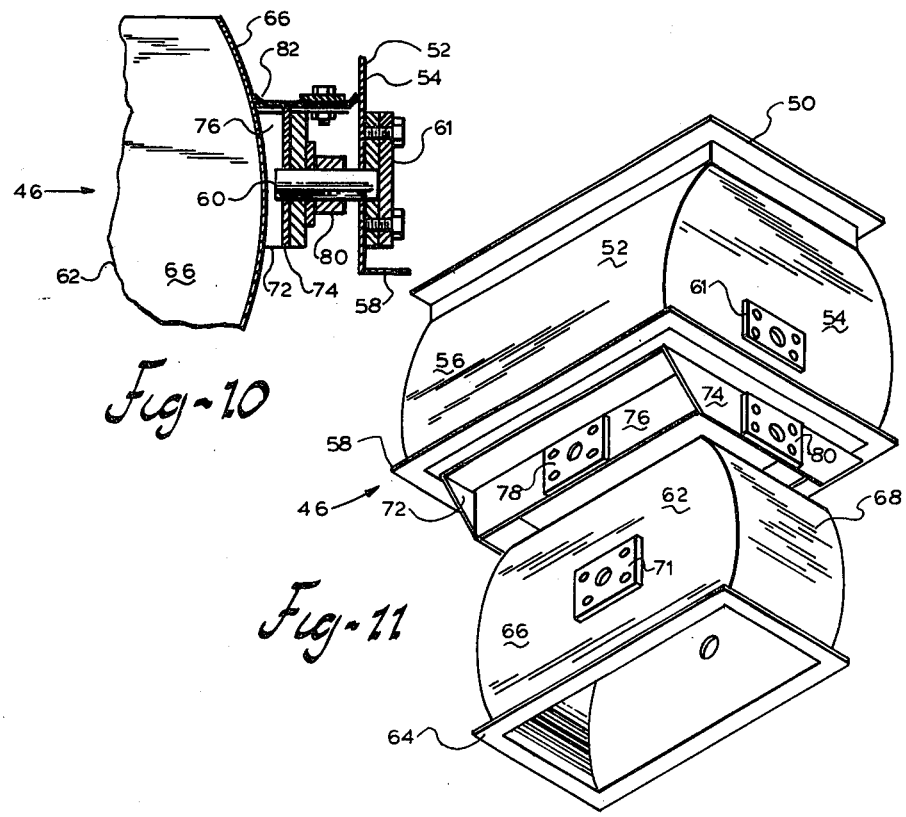
Fig-10
Fig-11

SUCTION PIPE

BACKGROUND OF THE INVENTION

(1) Field of the Invention

This invention relates to cotton gins, and more particularly to a suction pipe system for moving seed cotton into the cotton gin.

(2) Description of the Prior Art

For many years, it has been customary at cotton gins to move the cotton from trailers or wagons by a suction into the gin. Originally these suctions included a depending pick-up pipe, which were supported by a suction head which permitted the pick-up pipe to be swiveled or pivoted in any direction so that the bottom of the pick-up pipe could be moved around the surface of the load of seed cotton.

As the loads of cotton grew longer, it was deemed necessary or desirable to move the suction head along the length of the load of cotton. One method of accomplishing this, is to suspend the suction head by a carriage from a beam. The suction head is connected to the stationary pipe at the gin by an elevated, horizontal, pivot pipe. I.e. the pivot pipe pivoted at a point, and oscillated back and forth as the carriage moves back and forth along the beam. The pivot point of the pivot pipe is to one side of the elevated beam which supports the carriage carrying the suction head.

SIPE ET AL, U.S. Pat. No. 3,262,742 shows such a system. Also SIPE illustrates that often it is necessary or desirable to have two loads of cotton extending side by side. SIPE solves the problem by having a dual suction system, I.e. having one beam and pivot pipe with a depending pick-up pipe permanently mounted over the position of one load of cotton and a second beam with a suction head, pivot pipe and pick-up pipe mounted over the location of the second load of seed cotton.

SUMMARY OF THE INVENTION

(1) New and Different Function

I have invented a system where the suction head, carrying the pick-up pipe, is carried on a carriage along a beam. A plurality of telescoping sections are connected to the suction head. Each section is suspended by a hanger from the beam.

The carriage is moved along the beam by a pneumatic tire, which bears against the bottom flange of the beam by the weight of the electric motor which drives the pneumatic tire. The electric motor is a reversable motor and is reversed by a switch on the suction head.

The beam itself is mounted upon cross beams so that the traverse beam can be moved from a position over one load of seed cotton to a position over a second load of seed cotton.

The suction head includes two boxes mounted at right angles so that one can be pivoted back and forth along the beam and the other can be pivoted transversely on the beam. The two boxes are connected together by a frame, which is an enclosing border.

Thus it may be seen that with my new invention, that a longer travel along the length of the load of cotton is possible. Also, provisions can be made for having the suction operate over two loads of cotton without duplicating the system.

Therefore, it may be seen that the total function of my invention far exceeds the sum of the functions of the individual boxes, frames, hangers, motors, beams, etc.

(2) Objects of this Invention

An object of this invention is to move seed cotton into a cotton gin.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 3 is a top plan view of the total system.

FIG. 9 is a side elevational view of the suction head with parts broken away for purposes of illustration.

FIG. 10 is a partial sectional view of the suction head showing details of construction.

FIG. 11 is an exploded perspective view of the suction head.

FIG. 12 is a side elevational detail of part of the suction head carriage.

DESCRIPTION OF THE PREFERRED EMBODIMENT

Figure 1:
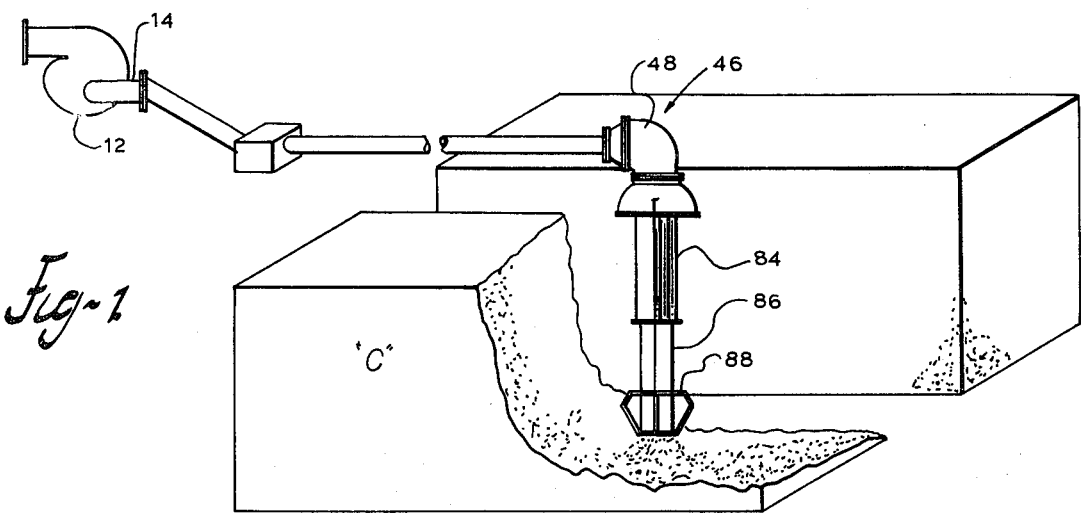
FIG. 1 is a schematic representation of a suction system according to my invention.

Referring more particularly to the drawings, there may be seen that this invention has as a principal feature straight, horizontal, elongated, elevated, traversing beam 10.

The traversing beam 10 will normally extend along parallel to one side of a cotton gin. The gin will include suction fan 12, which sucks the seed cotton from a load of seed cotton "C" and moves it into the gin. The intake 14 of the suction fan 12 extends to intake section 16 attached by stationary hangers 18 to traversing beam 10.

The traversing beam 10 is suspended by hangers from the cross beams 15. The cross beams themselves are supported by an overhead framework, which is carried atop pillars 17.

A plurality of telescoping sections 20 of pipe are telescoped into the intake section 16, at least when carriage 22 is in the full retracted position. Each section of pipe, including intake section 16, has a stiffening ring 24 at its outboard end. Also, each of the telescoping sections 20 has a band 26 on its inboard end. Teflon pads 28 are mounted on the exterior of the inboard end.

The carriage 22 is swung from the lower flange 42 by plurality of rollers 44 which ride on the top of the lower flange 42.

Chain 30 is attached along the bottom of each of the stiffening rings 24 to prevent the pipe from being pulled from the section into which it telescopes.

Figure 5:
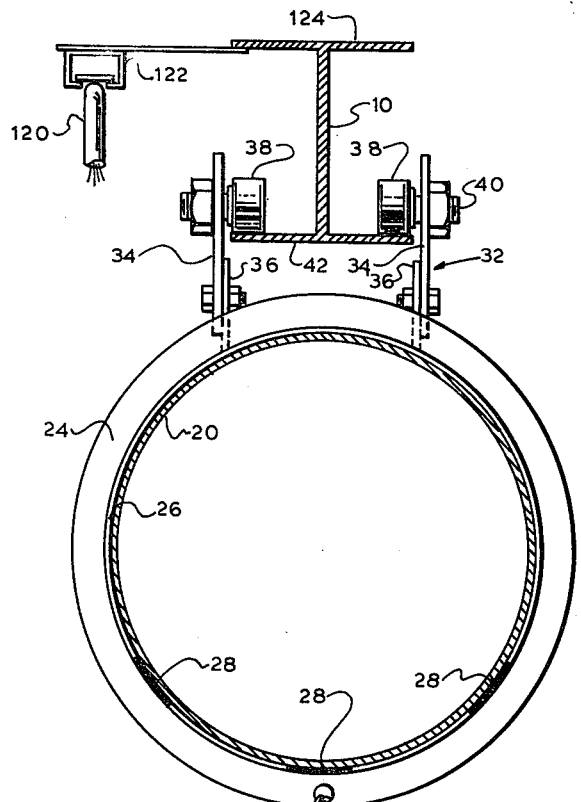
FIG. 5 is a sectional view taken substantially on lines 5—5, of FIG. 2 showing the detailed construction of hangers.
Figure 6:
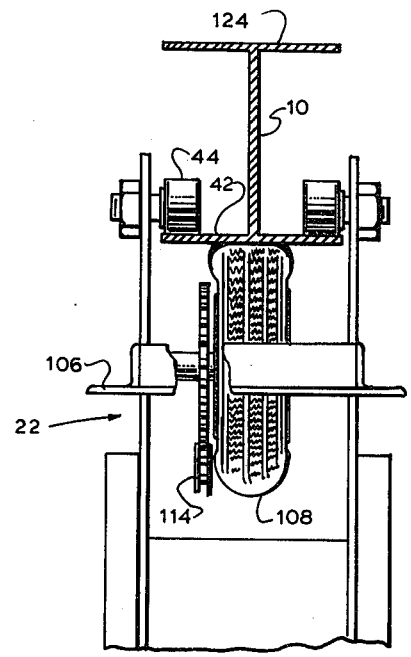
FIG. 6 is a partial sectional view taken substantially on lines 6—6 of FIG. 2 showing details of construction of the driving tire.
Figure 7:
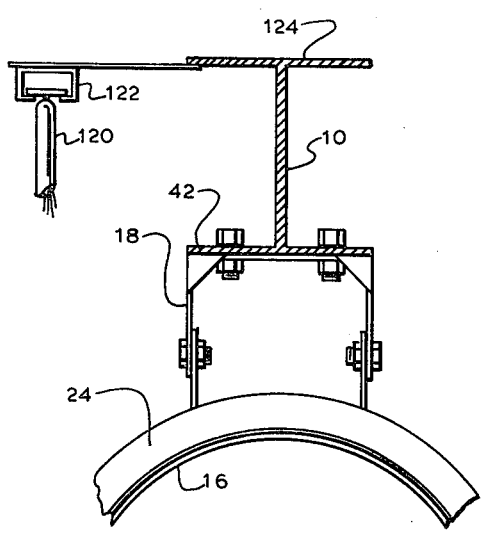
FIG. 7 is a sectional view taken substantially on lines 7—7 of FIG. 2 showing a stationary hanger.
Figure 8:
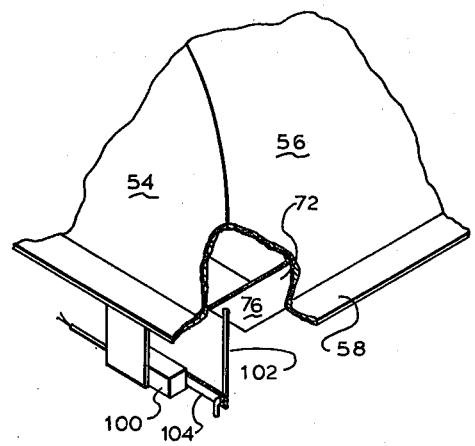
FIG. 8 is a partial perspective view of the suction head partially broken away showing the microswitch attachment therein.

Each of the telescoping sections 20 is supported by hanger 32 which is attached to the stiffening ring 24. Referring to FIG. 5 it may be seen that the hanger 32 includes a pair of straps 34 which are attached as by bolting to ears 36 attached to the stiffening ring 24. Each strap 34 carries a roller 38 which is journaled to stub shaft 40, which is bolted to the top of the straps 34.

The traversing beam 10 is an I-beam or an H-beam, as sometimes called. The rollers 38 roll above the top of the lower flange 42 of the traversing beam 10. The terminal telescoping section 20 is structurally supported by carriage 22 and pneumatically connects to the suction head 46 which is also structurally carried by the carriage 22. Specifically, the terminal telscoping section 20 connects to elbow 48.

The elbow 48 has lower flange which connects to upper flange 50 of top support box 52. The upper flange 50 is rectangular in shape. The support box 52 is open at the top and the bottom. The support box 52 includes two opposite, parallel, flat sides 54. These are connected to opposing, cylindrical sides 56. Any cross section of the box 52 is rectangular. Middle flange 58 is attached to the bottom lower edge of the support box 52. One support stub axle 60 is attached by plate 61 on each of the flat sides 54 near the middle flange 58. The two support stub axles 60 are co-axial. The cylindrical sides 56 are co-axial with the two support stub axles 60.

Bottom hang box 62 is partially nestled or nested into the support box 52. The hang box 62 is open at its top and bottom. Rectangular lower flange 64 is at the bottom of the hang box 62. The hang box 62 has opposing, flat, parallel sides 66. Hang box 62 also has cylindrical sides 68. Hang stub axle 70 is attached by plate 71 to each of the flat sides near the upper portion of the hang box 62. The two hang axles 70 are co-axial and the cylindrical side 68 are co-axial with the hang axles 70.

Rectangular frame 72, which is a surrounding border, has four sides: two opposing, parallel, support sides 74 and two opposing, parallel hang sides 76. When assembled, the hang sides 76 extend along the flat sides 66 of the hang box 62. The hang axle 70 is journaled within hang bearings 78 mounted on the hang side 76. The hang side 76 is just inside the cylindrical sides 56 of the support box 52.

The support sides 74 extend just inside of the flat sides 54 of the support box 52. Support bearing 80 is mounted upon each of the support sides 74 and is journaled to the support axle 60. The outside surface of cylindrical side 68 of the hang box 62 is adjacent to the support side 74.

The support side 74 and the hang side 76 of the frame 72 are angle-shaped. Flexible sheet 82, for example fabric reinforced rubber, is mounted upon the flat top of the support side 74 and hang side 76 of the frame 72. The flexible sheet 82 rubs against the four inside sides of the support box 52 and the four outside sides of the hang box 62. Therefore, the flexible sheet 82 forms an air seal between the support box 52 and hang box 62.

It will be particularly noted that the support function of the suction head is in the axles 60 and 70 and bearings 78 and 80. The support elements of the suction head are different from the seal elements, which is the flexible sheet 82. In this way, I am able to provide a smooth joint which flexes more smoothly and has longer life inasmuch as the same elements are not used for both support and sealing.

Figure 2:
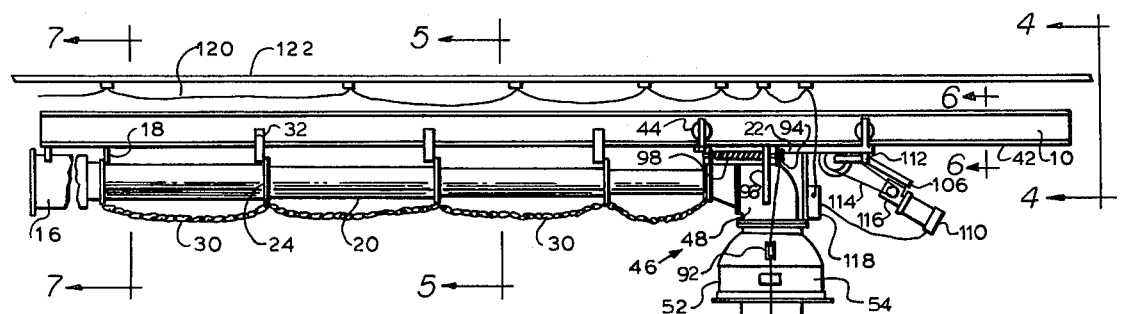
FIG. 2 is a side elevational view of the traversing beam with the telescoping sections, suction head and pick-up pipe suspended beneath it.
Figure 4:
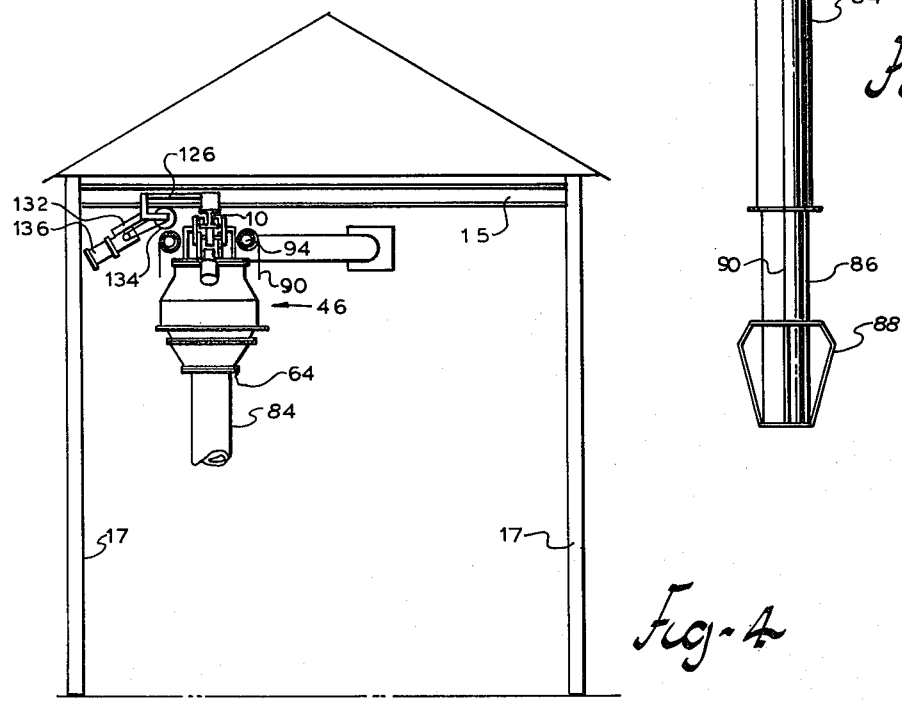
FIG. 4 is an end elevational view of the system.

Top barrel 84 of pick-up pipe has a flange which mates and is attached to the lower flange 64. (FIG. 2) The lower barrel 86 telescopes within the upper barrel 84. The two barrels are circular in cross section. The lower barrel 86 has handles 88 on the outside. Counterbalance cables 90 are attached to the bottom of the lower barrel 86 and extend upward through guide pulleys 92 mounted upon the support box 52. Tapered windlass drums 94 are mounted by bracket 96 to carriage 22. The drums 94 are rotated by helical springs 98. The springs 98 counterbalance the weight of the lower barrel 86 of the pick-up pipe.

Microswitch 100 is mounted upon mid flange 58. Pitman 102 extends from arm 104 of the switch 100 to hang side 76 of the frame 72. The hang axle 70 is parallel to the traversing beam 10. Therefore as the bottom of the pick-up pipe is moved away from the telescoping sections 20 the hang side 76 of the frame 72 will move downward on that side of the suction box toward the telescoping sections 20. This movement of the frame 72 will activate the switch 100 through the pitman 102. The switch 100 is electrically connected to locomotion means as explained later so that this causes the suction head 46 to be moved outward, i.e. it extends the telescoping sections 20. Likewise, if the bottom of the pick-up pipe is moved back toward the telescoping sections 20, this will cause the hang side 76 at that point to move upward, which motion will be transmitted through the pitman 102 to the switch 100 to cause the locomotion means to move the suction head 46 backwards or back toward the intake section 16 which causes the sections to retract. Thus it may be seen that the suction head 46 is moved along the load of seed cotton "C". The suction head 46 stays over the bottom of the lower barrel 86. The suction head 46 stays over the handles 88. As may be seen in the drawings, particularly FIG. 3, that the loads of seed cotton seed are much longer than they are wide so that the main problem is to move the suction head 46 along the length of the load and that the movement of the handles 88 (and thus the bottom of the pick-up) from side to side along the load is not a major problem.

To furnish locomotion to the carriage 22, I pivot lever 106 to the outboard end of the carriage 22. One end of the lever is bifurcated so that wheel 108 carrying a pneumatic tire is journaled to the bifurcated end. Electric motor 110 is structurally attached to the other end of the lever 106. The lever is pivoted by bolt 112 between the ends of the lever. Therefore, the weight of the motor will bias one end of the lever down, which will push the pneumatic tire on the other end of the lever 106 upward, against the lower flange 42 of the traversing beam 10. The electric motor 110 is connected to the wheel 108 by chain 114 and gear box 116. The electric motor 110 is a reversing motor. FIG. 12 shows the wheel 108 below its normal operating position for clarity of illustration.

Control box 118 is structurally connected to the suction head 46, specifically to the upper flange 50 of the support box 52. The control box 118 is electrically connected to the reversing electric motor 110, Electric cable 120, which is hung from track 122, which is attached to upper flange 124 of traversing beam 10. The electrical cable 120 provides electrical power to the control box 118 and through the control box to the electric motor 110. Whether the electric motor 110 is not energized; or energized going in the forward direction; or energized for the reverse direction; is controlled by the microswitch 100 as explained above.

According to the preferred design, there are four parallel cross beams 15 which are suspended from a structure above the ground. The structure is supported from the ground by pillars 17. Hangers hang the traversing beam 10 below the middle two cross beams 15. The hangers are similar in design and construction to the hangers 32 as described above. Beam carriages 126 depend by rollers from the end or outboard two cross beams 15. The beam carriages 126 are securely attached to the traversing beam 10 below the two outboard cross beams 15. The beam carriages 126 are similar to the carriage 22 in that they have a pivot bolt which pivots a lever 132 thereto. The lever 132 has a wheel 134 with a pneumatic tire on one end and a reversing electric motor 136 on the other. However, the electric cable and control box for the electric motor 136 have not been illustrated in the drawings for clarity of illustration. They would be mounted near ground level so they could be manually operated by workmen at that point. I.e. that when it was desired to move from one load of seed cotton "C" to another, the workmen would manually operate a switch at ground level which would supply the proper electrical power to motors 136 to achieve this purpose.

To convey the air from the intake section 16 to the intake 14 of the suction fan 12 a pivot 138 is attached to the intake section 16. Also a pivot 140 is attached to the intake 14. Then a telescoping section 142 connects the pivots 138 and 140.

Therefore, it may be seen that I have provided a efficient, economical, convenient structure to remove the seed cotton from the loads outside of the gin into the gin.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| 10 traversing arm | 46 suction head |
| 12 suction fan | 48 elbow |
| 13 hangers | 50 upper flange |
| 14 intake | 52 support box |
| 15 cross beams | 54 flat sides |
| 16 intake section | 56 cylindrical sides |
| 17 pillars | 58 middle flange |
| 18 stationary hangers | 60 support stub axle |
| 20 telescoping sections | 61 axle plate |
| 22 carriage | 62 hang box |
| 24 stiffening ring | 64 lower flange |
| 26 band | 66 flat sides |
| 28 Teflon pads | 68 cylindrical sides |
| 30 chain | 70 hang stub axle |
| 32 hanger | 71 axle plate |
| 34 straps | 72 frame |

-continued

| | |
|---|---|
| 36 ears | 74 support sides |
| 38 rollers | 76 hang sides |
| 40 stub shaft | 78 hang bearing |
| 42 lower flange | 80 support bearing |
| 44 rollers | 82 flexible sheet |
| 84 barrel | 116 gear box |
| 86 lower barrel | 118 control box |
| 88 handle | 120 cable |
| 90 counterbalance cables | 122 track |
| 92 guide pulleys | 124 upper flange |
| 94 drums | 126 beam carriages |
| 96 bracket | 128 roller |
| 98 springs | 130 pivot |
| 100 microswitch | 132 lever |
| 102 pitman | 134 wheel |
| 104 arm | 136 electric motor |
| 106 lever | 138 pivot |
| 108 wheel | 140 pivot |
| 110 motor | 142 telescope |
| 112 pivot | "C" load of seed cotton |
| 114 chain | |

I claim as my invention:

1. An improved suction head comprising:
   a. a top support box with
   b. an upper flange adapted to be connected to a section of pipe,
   c. said top support box having opposing, flat, parallel sides,
   d. two co-axial support stub axles, one of the axles attached to each flat side,
   e. said top support box having opposing, cylindrical sides co-axial with said stub axles,
   f. a bottom hang box with
   g. a lower flange adapted to be attached to a pick-up pipe,
   h. said bottom hang box having opposing, flat, parallel sides,
   i. two co-axial hang stub axles, one of the hang axles attached to each flat side of the hang box,
   j. said bottom hang box having opposing, cylindrical sides co-axial with said hang axles,
   k. a rectangular frame having
      (i) two opposing, parallel sides designated as support sides, and
      (ii) two opposing, parallel sides designated as hang sides,
   l. said support sides of the frame journaled to said support axles,
   m. said hang sides of the frame journaled to said hang axles,
   n. a support seal flap attached to each of the support sides of the frame,
   o. each of the support flaps rubbing against one of the flat sides of the support box on the outside of the frame and against one of the cylindrical sides of the hang box on the inside of the frame, and
   p. a hang seal flap attached to each of the hang sides of the frame,
   q. each of the hang flaps rubbing against a flat side of the hang box on the inside of the frame and against the cylindrical side of the support box on the outside of the frame.

2. An improved suction structure adopted to move seed cotton into a cotton gin comprising:
   a. a straight, horizontal, elogated, elevated, traverse beam having
   b. a lower flange,
   c. a fan having
   d. an intake pipe leading to e. an intake section attached under one end of the beam,
f. a plurality of telescoping sections of pipe in telescope relationship to the intake section,
g. a pipe hanger on each of the telescoping sections of pipe,
h. rollers journaled on each of the hangers riding on the lower flange of the beam, thus supporting the telescoping sections,
i. a suction head,
j. a carriage on the suction head suspending the head from the beam,
k. a depending pick-up pipe flexibly connected by the suction head to one of the sections of pipe,
l. a pneumatic tire journaled to the suction head,
m. bias means for biasing the tire against the bottom of the flange on the beam, said suction head including:
n. an electric motor drivingly connected to the tire,
o. a top support box with
p. an upper flange attached to one of the sections of pipe,
q. said top support box having opposing, flat, parallel sides,
r. two co-axial support stub axles, one of the axles attached to each flat side,
s. said top support box having opposing, cylindrical sides co-axial with said stub axles,
t. a bottom hang box with
u. a lower flange attached to the pick-up pipe,
v. said bottom hang box having opposing, flat, parallel sides,
w. two co-axial hang stub axles, one of the hang axles attached to each flat side of the hang box,
x. said bottom hang box having opposing, cylindrical sides co-axial with said hang axles,
y. a rectangular frame having
   (i) two opposing, parallel sides designated as support sides, and
   (ii) two opposing, parallel sides designated as hang sides,
z. said support sides of the frame journaled to said support axles,
aa. said hang sides of the frame journaled to said hang axles,
bb. a support seal flap attached to each of the support sides of the frame,
cc. each of the support flaps rubbing against one of the flat sides of the support box on the outside of the frame and against one of the cylindrical sides of the hang box on the inside of the frame, and
dd. a hang seal flap attached to each of the hang sides of the frame,
ee. each of the hang flaps rubbing against a flat side of the hang box on the inside of the frame and against the cylindrical side of the support box on the outside of the frame.

* * * * *